United States Patent
Vos et al.

(10) Patent No.: US 8,582,631 B2
(45) Date of Patent: Nov. 12, 2013

(54) MANAGING COMMUNICATION OPERATIONS OF WIRELESS DEVICES

(75) Inventors: Gustav Gerald Vos, Surrey (CA); Steven John Bennett, Coquitlam (CA); Huaming Wu, San Diego, CA (US); Richard Thomas Kavanaugh, Encinitas, CA (US)

(73) Assignee: Sierra Wireless, Inc., Richmond (CA)

( * ) Notice: Subject to any disclaimer, the term of this patent is extended or adjusted under 35 U.S.C. 154(b) by 194 days.

(21) Appl. No.: 13/093,757

(22) Filed: Apr. 25, 2011

(65) Prior Publication Data

US 2011/0261891 A1    Oct. 27, 2011

Related U.S. Application Data

(60) Provisional application No. 61/328,139, filed on Apr. 26, 2010.

(51) Int. Cl.
*H04B 3/46*    (2006.01)

(52) U.S. Cl.
USPC ............................. 375/224; 375/219; 375/259

(58) Field of Classification Search
USPC ........ 375/224, 259, 231; 370/241; 455/67.11; 702/79
See application file for complete search history.

(56) References Cited

U.S. PATENT DOCUMENTS

| 5,982,757 A * | 11/1999 | Curtis et al. | 370/328 |
| 7,076,556 B1 * | 7/2006 | Brock et al. | 709/228 |
| 2008/0240734 A1 * | 10/2008 | Fuse | 398/200 |

OTHER PUBLICATIONS

3rd Generation Partnership Project; Technical Specification Group Services and System Aspects; Service requirements for machine-type communications; Stage 1 (Release 10), 3GPP TS 22.368 V1.1.1, Nov. 2009, 3rd Generation Partnership Project.

"3rd Generation Partnership Project; Technical Specification Group GSM/EDGE Radio Access Network; General Packet Radio Service (GPRS); Mobile Station (MS)—Base Station System (BSS) interface; Radio Link Control/Medium Access Control (RLC/MAC) protocol (Release 9)," 3GPP TS 44.060 V9.2.0, Dec. 2009, 3rd Generation Partnership Project.

* cited by examiner

*Primary Examiner* — Dhaval Patel
(74) *Attorney, Agent, or Firm* — DLA Piper LLP (US)

(57) ABSTRACT

Management of communication operations of wireless devices is provided. A traffic-control parameter is generated, for example at a base station, indicative of desired aspects of communication operations of the wireless devices. The one or more traffic-control parameters may comprise a delay parameter, such as a maximum value for generating random backoff times, and/or a connection-time parameter, indicative of the maximum length of time a wireless device can hold a connection. A bit sequence indicative of the one or more traffic-control parameters is generated and communicated to the wireless devices. A wireless device determines the traffic-control parameter based on the communicated bit sequence and adapts its operation based thereon.

34 Claims, 8 Drawing Sheets

MANAGING COMMUNICATION OPERATIONS OF WIRELESS DEVICES

TECHNICAL FIELD

This application claims priority under 35 U.S.C. §119(e) of U.S. Provisional Application Ser. No. 61/328,139 filed Apr. 26, 2010, which is hereby incorporated by reference in its entirety.

The present technology pertains in general to wireless communication systems, and in particular to a method, system and apparatus for managing communication operations of wireless devices.

BACKGROUND

Wireless communication networks are increasingly used for both voice and data communications. To enable data communications, a number of different data services have been designed. Such services are available for example through GPRS (general packet radio service) and GSM (Global System for Mobile Communication) or UMTS (Universal Mobile Telephone System) as well as LTE (Long Term Evolution). Protocols such as HSDPA (high-speed downlink packet access) and HSUPA (high-speed uplink packet access) may be used to enable data services, for example in UMTS systems.

The availability of data services has given rise to wireless communication networks which may simultaneously support human-to-human voice communication sessions as well as human-to-human data communication sessions and machine-to-machine data communication sessions, and possibly even human-to-machine data communication sessions. Different types of communication sessions have different requirements. For example, human-to-human sessions are typically less delay-tolerant than many machine-to-machine sessions, which may in some instances tolerate delays of hours or days. Different types of sessions may also have different connection times, different bandwidth requirements, and the like. Due to these differences, management of communications and traffic in such multi-faceted wireless communication networks differs substantially from management of traditional networks supporting voice communication only.

For example, traditional approaches to wireless communication system management may not take into account different communication requirements to and from different types of wireless devices. This approach, however, does not account for specific needs of different types of wireless devices, nor is it set up to take advantage of different behaviours of different device types to improve system performance. This may result in significant network congestion at times of peak demand, requiring significant capital expenditures to equip the system for large peak traffic demands.

The need for more sophisticated communication system management is described in Technical Specification: "Service requirements for machine-type communications", Stage 1, 3GPP TS 22.368 V1.1.1, which addresses the problem of congestion by M2M communication. This reference describes aspects of increased network traffic caused by various forms of M2M communications. It, however, does not teach a solution.

Some wireless communications networks, such as UMTS networks, have the ability to inhibit wireless devices from transmitting by using a base station broadcast transmitted control bit. However, this may cause problems, for example if the period of inhibition has been long enough to result in a large backlog of transmissions which may overload the system when the control bit is reset. In a wireless communication system supporting mainly human users, this problem may be less severe, since there the users will typically randomly try to transmit and will be less likely to do so simultaneously. However, for wireless communication systems containing larger numbers of machine-type wireless devices, these machine-type wireless devices may all transmit as soon as the control bit is reset, thereby causing significant congestion problems. In addition, any new solution to this problem should be compatible both with existing wireless communication protocols and wireless devices already deployed in the field, so as to reduce operational impact when providing upgrades to the network and/or individual devices.

Therefore there is a need for a solution that overcomes at least one of the deficiencies in the art.

This background information is provided to reveal information believed by the applicant to be of possible relevance to the present technology. No admission is necessarily intended, nor should be construed, that any of the preceding information constitutes prior art against the present technology.

SUMMARY OF THE TECHNOLOGY

An object of the present technology is to provide a method, system and apparatus for managing traffic control of wireless devices. According to an aspect of the present technology there is provided a method for managing communication operations of at least one wireless device in a wireless communication system, the method comprising generating one or more traffic-control parameters indicative of one or more aspects of communication operations of the at least one wireless device; generating a bit sequence indicative of one or more traffic-control parameters; communicating the bit sequence to the at least one wireless device; determining, at the at least one wireless device, the one or more traffic-control parameters based on the communicated bit sequence; and adapting, at the at least one wireless device, communication operations based on the one or more traffic-control parameters.

According to another aspect of the present technology there is provided a system for managing communication operations of at least one wireless device in a wireless communication system, the system comprising a base station configured to generate one or more traffic-control parameters indicative of one or more aspects of communication operations of the at least one wireless device; generate a bit sequence indicative of the one or more traffic-control parameters; and transmit the bit sequence for receipt by the at least one wireless device; and at least one wireless device configured to receive the bit sequence; determine the one or more traffic-control parameters based on the received bit sequence; adapt communication operations based on the one or more traffic-control parameters.

According to another aspect of the present technology there is provided a base station configured for managing traffic control of at least one wireless device, the base station comprising a control module configured to generate one or more traffic-control parameters indicative of one or more aspects of communication operations of the at least one wireless device, the control module further configured to generate a bit sequence indicative of the one or more traffic-control parameters; and a transceiver configured to transmit the bit sequence for receipt by the at least one wireless device.

According to another aspect of the present technology there is provided a wireless device comprising a transceiver configured to receive a bit sequence indicative of one or more traffic-control parameters; and a control module configured to determine the one or more traffic-control parameters based on the received bit sequence and adapt communication operations based on the determined traffic-control parameter.

According to another aspect of the present technology there is provided a computer program product comprising a memory having computer readable code embodied therein, for execution by a CPU, for performing a method for managing communication operations of at least one wireless device in a wireless communication system, the method comprising generating one or more traffic-control parameters indicative of one or more aspects of communication operations of the at least one wireless device; generating a bit sequence indicative of one or more traffic-control parameters; communicating the bit sequence to the at least one wireless device; determining, at the at least one wireless device, the one or more traffic-control parameters based on the communicated bit sequence; and adapting, at the at least one wireless device, communication operations based on the one or more traffic-control parameters.

According to another aspect of the present technology there is provided a computer program product comprising a memory having computer readable code embodied therein, for execution by a CPU, for performing a method for managing communication operations of at least one wireless device in a wireless communication system, the method comprising generating one or more traffic-control parameters indicative of one or more aspects of communication operations of the at least one wireless device; generating a bit sequence indicative of one or more traffic-control parameters; communicating the bit sequence to the at least one wireless device.

According to another aspect of the present technology there is provided a computer program product comprising a memory having computer readable code embodied therein, for execution by a CPU, for performing a method for managing communication operations of at least one wireless device in a wireless communication system, the method comprising determining, at the at least one wireless device, one or more traffic-control parameters based on a communicated bit sequence; and adapting, at the at least one wireless device, communication operations based on the one or more traffic-control parameters.

DETAILED DESCRIPTION OF THE TECHNOLOGY

Definitions

Figure 1:
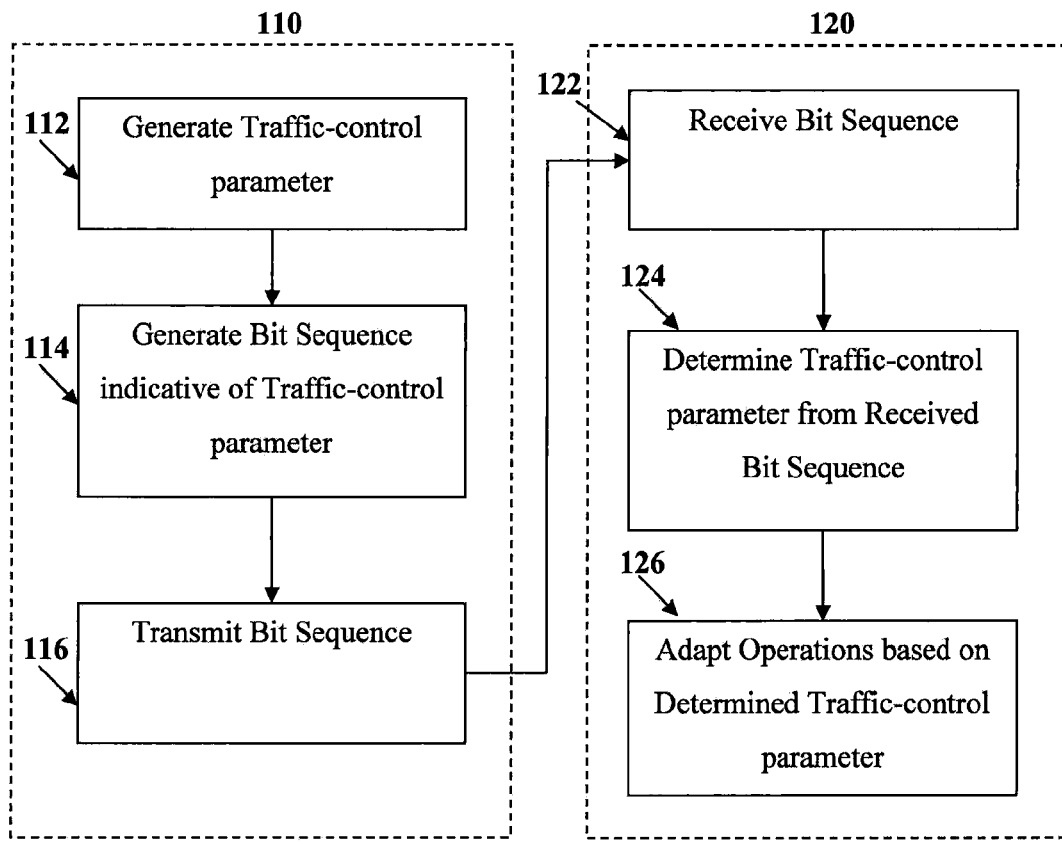
FIG. 1 illustrates a method for managing traffic control of wireless devices, in accordance with embodiments of the present technology.

The term "wireless device" is used to refer to an apparatus for analog and/or digital transmission and/or reception of signals for communication purposes via electromagnetic radiation propagating, for example, through vacuum, or air, or a generally non-conductive medium to or from another apparatus. The wireless device may use signals formatted according to one or more of a number of communication systems including mobile phone networks such as cellular or satellite phone networks, or other current or future wireless communication systems, for example. A wireless device can comprise or be included in one or more of various forms of handheld/mobile and/or stationary communication, control and/or computing devices such as a meter reader, teller machine, vehicle or goods tracker or theft alarm apparatus, radio, mobile phone, cellular phone, satellite phone, Smartphone, or a personal computer (PC) such as a desktop, notebook, tablet PC, personal digital assistant (PDA), game console, or peripherals such as a printer, camera, pointing device, or other apparatus, for example. A wireless communication device may be configured for voice and/or data communication in accordance with standard or proprietary communication protocols as would be understood by a worker skilled in the art.

The term "machine-type wireless device" is used to refer to a wireless device which is configured to automatically communicate data over a wireless communication network without necessarily requiring interaction of a human user. These may also be referred to as M2M (machine-to-machine) terminals or MTC (machine-type communication) terminals.

The term "network sector" is used to refer to a portion of a wireless communication system. The term is used in combination with a conceptual portioning of the wireless communication system into parts of a wireless communication system. The portioning may occur at a predetermined level in a hierarchy of wireless communication system architecture. For example, in a cellular wireless communication system, a network sector may refer to portions of the communication system that are associated with a sector of a base transceiver station (BTS or NodeB), a BTS, a radio network controller (RNC), a serving general packet radio service (GPRS) support node (SGSN), a gateway GPRS support node (GGSN), a mobility management entity (MME), a serving gateway (S-GW), packet data network gateway (PDN-GW) or other part of the wireless communication system, for example.

As used herein, the term "about" refers to a +/−10% variation from the nominal value. It is to be understood that such a variation is always included in a given value provided herein, whether or not it is specifically referred to.

Unless defined otherwise, all technical and scientific terms used herein have the same meaning as commonly understood by one of ordinary skill in the art to which this technology belongs.

According to various embodiments of the present technology, there is provided a method for managing communication operations of wireless devices, a system for managing communication operations of wireless devices, a base station configured for managing communication operations of wireless devices, a wireless device for communication with a wireless communication system, and associated computer program products. The method, system, base station, wireless device, and associated computer program products are configured as described in more detail herein.

In accordance with an aspect of the present technology there is provided a method for managing communication operations of at least one wireless device in a wireless communication system. The method comprises generating one or more traffic-control parameters indicative of one or more desired aspects of communication operations of the at least one wireless device. For example, one or more traffic-control parameters may include a delay parameter, a connection-time parameter, or the like, or a combination thereof.

The method further comprises generating a bit sequence indicative of the one or more traffic-control parameter. The bit sequence may encode the one or more traffic-control parameters in a binary sequence of predetermined length. In some embodiments, one or more traffic-control parameters may be encoded as a binary value which may optionally be channel coded. In some embodiments, one or more traffic-control parameters may be encoded as a ratio of ones to zeros in the binary sequence.

The method further comprises communicating the bit sequence to at least one wireless device. The method further comprises determining, at the at least one wireless device, one or more traffic-control parameters based on the communicated bit sequence. For example, each wireless device may use a sliding window method to determine one or more traffic-control parameters based on the last N bits received.

Generation of one or more traffic-control parameters and a bit sequence indicative thereof may be performed for example by network management equipment such as a server or computing device operatively coupled or incorporated into a base station. Communication of the bit sequence may be performed via messages broadcast from the base station. In embodiments of the present technology, the bit sequence is communicated using one or more bits of each of two or more sequential broadcast traffic control messages or system information messages. For example, a spare bit of a periodically broadcast system information message may be used to communicate the bit sequence at a rate of one bit per periodic broadcast message.

The method further comprises adapting, at the at least one wireless device, communication operations based on determined traffic-control parameters. In some embodiments, adapting operations based on a determined delay parameter may comprise generating a delay time, such as a random or pseudo-random backoff time, based on the determined delay parameter, and waiting until the delay time elapses before initiating communication operations. The delay parameter may indicate a maximum value for the backoff time, for example. In some embodiments, adapting operation based on a determined connection-time parameter comprises generating a maximum connection time based on the determined connection-time parameter and limiting duration of communication operations to be less than or equal to the maximum connection time.

In accordance with various other aspects of the present technology, there is provided a base station, a wireless device, and/or a system thereof, configured for managing communication operations of at least one wireless device in a wireless communication system. For example, a base station may be provided. The base station is configured to generate one or more traffic-control parameters indicative of one or more desired aspects of communication operations of the at least one wireless device. The base station is further configured to generate a bit sequence indicative of the one or more traffic-control parameters. The base station is further configured to transmit the bit sequence to the at least one wireless device. Furthermore, one or more wireless devices may be provided. Each wireless device is configured to receive the bit sequence and determine the one or more traffic-control parameters based on the received bit sequence. Each wireless device is further configured to adapt communication operations based on the determined traffic-control parameter.

According to another aspect of the present technology, there is provided a computer program product comprising a memory having computer readable code embodied therein, for execution by a CPU, for performing a method for managing communication of a wireless device with a wireless communication system, such as a method or portion thereof as described herein. A first computer program product may be provided for performing a method or portion thereof associated with a base station, and a second computer program product may be provided for performing a method or portion thereof associated with a wireless device.

FIG. 1 illustrates method for managing communication operations of at least one wireless device in accordance with embodiments of the present technology. As illustrated, the method comprises a first set of operations 110 and a second set of operations 120. The first set of operations 110 may be performed for example at a base station, and the second set of operations 120 may be performed for example at each of the at least one wireless devices. The base station and wireless devices may make up a system in accordance with embodiments of the present technology. The method comprises generating 112 a traffic-control parameter indicative of one or more desired aspects of communication operations of the at least one wireless device. The one or more traffic-control parameters may comprise a delay parameter and/or a connection-time parameter, or the like. The method further comprises generating 114 a bit sequence indicative of the one or more traffic-control parameters, for example by encoding the one or more traffic-control parameters in the bit sequence. The method further comprises communicating the bit sequence to the at least one wireless device, for example by transmitting 116 and receiving 122 the bit sequence. The method further comprises determining 124 the one or more traffic-control parameters, based on the communicated bit sequence. The method further comprises adapting 126 communication operations based on the determined traffic-control parameter. For example, adapting communication operations may comprise generating a delay time based on a determined delay parameter and waiting until the delay time elapses before initiating communication operations. As another example, adapting communication operations may comprise generating a maximum connection time based on a determined connection-time parameter and limiting duration of communication operations to be less than or equal to the maximum connection time.

Figure 2:
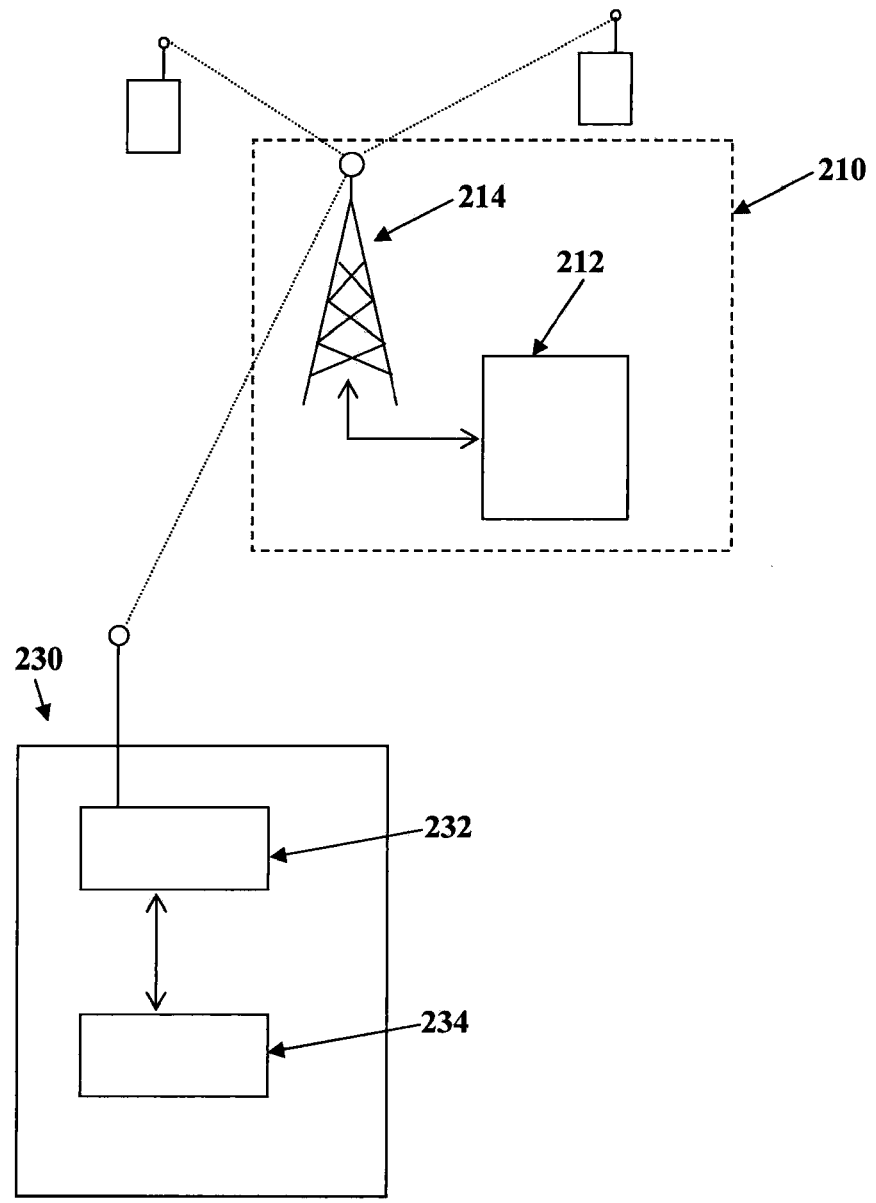
FIG. 2 illustrates a base station, a wireless device, and a system for managing traffic control of wireless devices, in accordance with embodiments of the present technology.

FIG. 2 generally illustrates a base station system 210 and a wireless device 230 in accordance with embodiments of the present technology. The base station system 210 and the wireless device 230 may be configured as parts of a system for managing communication operations of wireless devices. The base station system 210 comprises a control module 212 configured to generate a traffic-control parameter indicative of one or more desired aspects of communication operations of the at least one wireless device 230. The control module 212 is further configured to generate a bit sequence indicative of the one or more traffic-control parameters. The base station system 210 further comprises a transceiver 214 configured to transmit the bit sequence to the at least one wireless device 230. The wireless device 230 comprises a transceiver 232 configured to receive a bit sequence indicative of a traffic-control parameter. The wireless device 230 further comprises a control module 234 configured to determine the one or more traffic-control parameters based on the received bit sequence, and to adapt communication operations based on the determined traffic-control parameter.

Communication Management

The present technology relates to communication management of wireless devices. For example, the present technology may be configured to selectably enable or inhibit wireless communication from wireless devices. The present technology may additionally or alternatively be configured to influence delay times, such as random backoff times, at a wireless device, such that the device is configured to wait until the delay time elapses before initiating communication operations. The present technology may additionally or alternatively be configured to set a maximum connection time at a wireless device, wherein duration of communication operations is restricted to be less than or equal to the maximum connection time.

Embodiments of the present technology may be configured for managing communication operations of machine-type wireless devices. Various types of machine-type wireless devices may exhibit communication requirements that are different in a number of ways from communications with other wireless devices. For example, in contrast to traditional voice or data communications for human users, M2M/MTC communications may involve larger numbers of communicating devices with comparatively little traffic per device. M2M/MTC communications may also be substantially delay-tolerant in many cases, so that pending communications may be stored until a later time with few or no serious consequences. Communications involving several such wireless devices may, without sufficient communications management, cause network traffic congestion and/or overload the wireless communication system. Examples of machine-type wireless devices include wireless utility meters, asset trackers, sensors, monitors, actuators, ATM machines, or portions thereof, or the like.

Embodiments of the present technology may additionally or alternatively relate to managing communication operations of other wireless devices, such as cell phones, PDAs, and the like. For example, the present technology may be configured to selectably enable or inhibit wireless communication, influence delay times, and maximum connection times of wireless devices of different types. However, in such cases, the manner in which the present technology is implemented may be subject to considerations such as user satisfaction requirements, service level agreements, and the like.

Embodiments of the present technology may be directed to one or more aspects of network management. For example, the present technology may be configured to facilitate improved sharing of network resources; management of peak demands for communication resources, throttling of certain types of traffic, such as M2M traffic, for example to facilitate balancing or prioritization of different traffic types; throttling or inhibition of traffic for example in the event of an emergency or imminent congestion failure; smooth reintroduction of traffic after throttling or inhibition in the face of pent-up resource demand; or the like, or a combination thereof.

Figure 3:
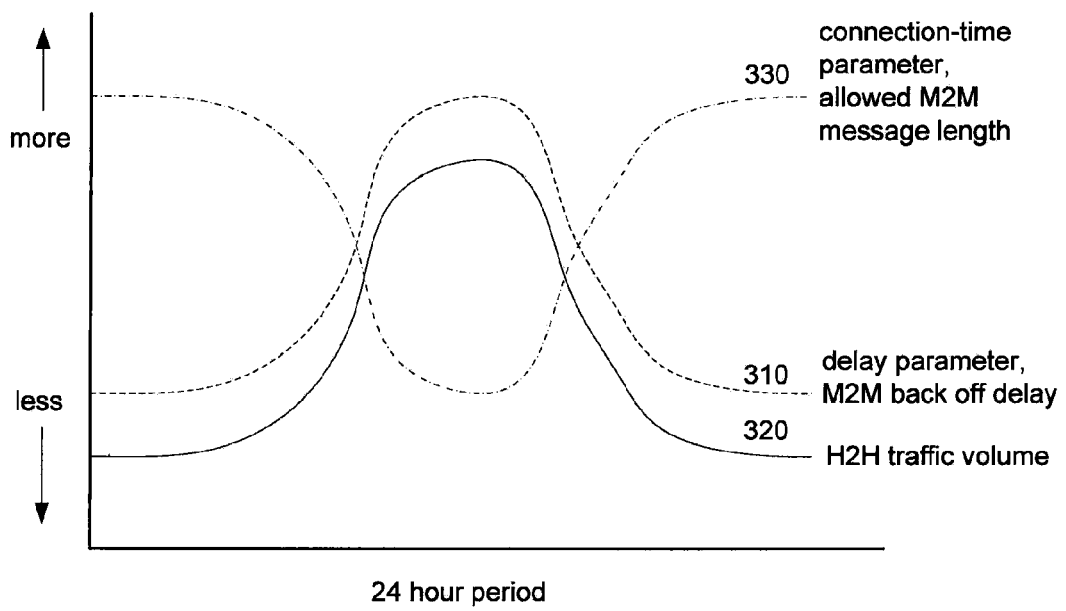
FIG. 3 illustrates how traffic-control parameters for machine-type wireless devices may be controlled in a wireless communication system based on human-to-human traffic volumes expected or measured at different times of day, in accordance with embodiments of the present technology.

As an illustrative example, FIG. 3 illustrates how a delay parameter 310, which for example indicates the maximum value of a uniformly, pseudo-randomly generated back-off time for machine-type devices, may be increased at times when human-to-human transmission traffic 320 is higher, and decreased when such traffic is lower. FIG. 3 further illustrates how a connection-time parameter 330, which may indicate the allowed maximum duration of connection time, the length of M2M messages, or the total amount of messages that a machine-type device can transmit, may be adjusted to facilitate appropriate use of communication resources by machine-type devices based on fluctuating high human-to-human traffic levels 320. The connection-time parameter 330 is decreased when human-to-human traffic 320 is high, and increased when human-to-human traffic 320 is low.

Figure 4A:
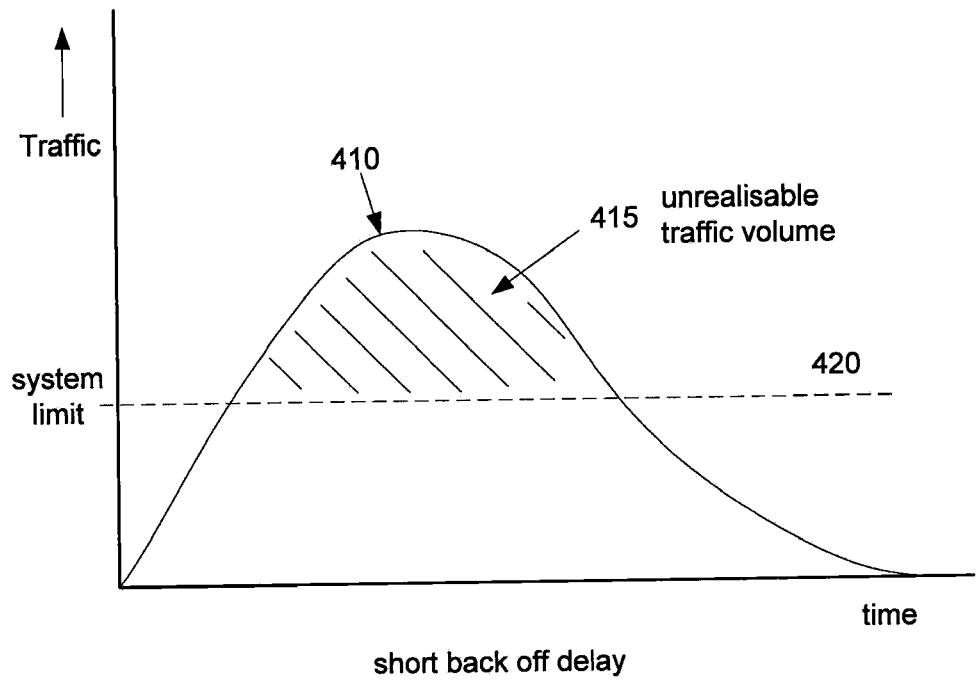
FIGS. 4A and 4B illustrate how M2M traffic can be controlled to reduce a peak of traffic after a period when it has been inhibited, in accordance with embodiments of the present technology.

FIG. 4A shows an example of time-variation in network traffic levels, due to machine-type devices and/or other devices operating in accordance with a relatively small delay parameter. The delay parameter may indicate the maximum value M of a back-off time pseudo-randomly generated and having a uniform distribution between 0 and M. A small value of M results in a peak traffic level 410 which may exceed a communication system limit 420. Where the peak traffic level 410 exceeds the system limit 420, the shaded portion of traffic 415 may not be realisable. What will happen under these circumstances depends on how the system handles excess requests to transmit. From the perspective of the human users this will usually result in unacceptable delays in establishment of a connection or making a voice call.

Figure 4B:
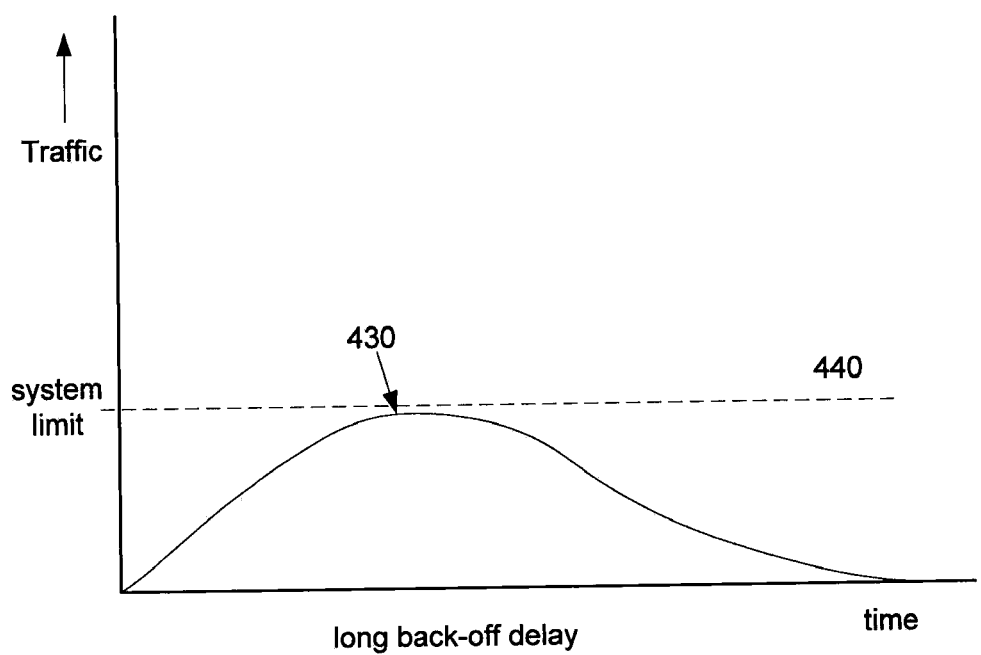

In contrast to FIG. 4A, FIG. 4B shows how the peak of the transmit traffic 430 can be held below the system limit 440 by increasing the maximum value M of the random backoff time generator, as communicated in the delay parameter. Traffic is spread out in time and hence peak traffic is reduced. This may facilitate avoiding overloading of the system, and managing the system such that human users do not become aware of the effects of loading due to the presence of a number of devices, such as machine-type devices. In some cases, machine-type devices carrying lower priority traffic may be delayed, for example by using a large value of M, for much longer than human-to-human terminals and also longer than machine-type devices that need quick access, for example alarm terminals.

Generation and Communication of Bit Sequence

Embodiments of the present technology relate to generation and communication of a bit sequence, indicative of a traffic-control parameter, from a base station to one or more wireless devices. The base station and the wireless devices are communicatively coupled via a wireless communication system.

The wireless communication system may be associated with a cellular network, GSM, UMTS, CDMA2000, LTE, Wi-Fi or Wi-MAX network, or the like, for example. The wireless device comprises a transceiver/network interface for establishing an operative connection with the wireless communication system. For example, the transceiver/network interface may comprise a wireless transceiver configured to couple with a wireless communication system such as a system associated with a cellular network, GSM, UMTS, CDMA2000, LTE, Wi-Fi or Wi-MAX network, or the like. The wireless device further comprises a control module operatively coupled to the network interface. The base station may similarly be a standard cellular base station, NodeB, eNodeB, or the like, configured in part in accordance with the present technology via its control module.

The wireless communication system may operate in accordance with a wireless communication protocol such as GSM, UMTS, or the like. Wireless devices in the wireless communication system may be machine-type devices, wireless devices configured in accordance with the present technology, mobile wireless devices such as cellular telephones, mobile routers, PDAs, wireless-enabled cameras, laptops, vehicle-mounted wireless systems, or the like. The wireless communication system may further comprise other base stations NodeB's, wireless access points, or the like, which may be communicatively coupled with other wireless devices. The base stations may be communicatively coupled with each other and with data networks, telephone networks, other wireless communication systems, and the like, via infrastructure equipment, such as equipment of a network backbone.

In some embodiments, the wireless communication system may be a GSM or similar system. Wireless communication systems operating in accordance with a current GSM standard include a random access channel and a message comprising a 16-bit data field that is regularly transmitted by base stations to wireless devices. The 16-bit data field is used in part to indicate to groups of wireless devices whether they are inhibited from transmitting or allowed to transmit. Each bit is indicative of an Access Class. In one version of the standard, a wireless device in a predetermined Access Class x is allowed to transmit if the bit corresponding to Access Class x in the 16-bit data field is set to zero.

In wireless communication systems compliant with a current version of the GSM standard, system information messages on the BCCH are periodically broadcast, these messages indicative of a list of authorized Access Classes and authorized special access classes. Embodiments of the present technology may be applied globally to all machine-type devices in receipt of such system information messages, in contrast to specific groups of devices being targeted. In versions of the GSM standard, wireless devices listen to the system information messages that are broadcast inside the PRACH Control parameter of the Packet system information type 1 (SIB1) which are sent out about every 235.62 ms, as detailed for example in 3GPP TS 44.060, "Technical Specification 3rd Generation Partnership Project; Technical Specification Group GSM/EDGE Radio Access Network; General Packet Radio Service (GPRS); Mobile Station (MS)—Base Station System (BSS) interface; Radio Link Control/Medium Traffic control (RLC/MAC) protocol (Release 9)," V9.2.0, December, 2009.

In versions of the GSM standard, the first ten bits of the 16-bit data field are typically monitored by wireless devices to determine whether individual bits are set or not. Wireless devices are each assigned particular ones of the ten available bits to monitor so as to determine whether they are currently inhibited from transmitting or not. All, none or selected ones of these ten bits can be set to indicate to wireless devices whether they can access the system. These bits may be assigned to groups according to their rank of importance or class of service provided to the users of the remote terminals. They may also be randomly assigned the right to transmit in order to control the overall level of traffic in the network in order to avoid congestion of the wireless communication system.

In versions of the GSM standard, the remaining 6 bits of the 16-bit data field are mostly assigned for engineering service. In embodiments of the present technology, at least one of these remaining six bits, preferably spare or unassigned bits, may be used for communicating the bit sequence indicative of the one or more traffic-control parameters, for example by varying this bit over sequential broadcasts of the 16-bit data field or system information message comprising same.

In some embodiments, a spare bit of the 16-bit data field may be used, at least in part, as a specific control bit for inhibiting or allowing transmission from machine-type devices, or other specified wireless devices, operating in the wireless communication system. Alternatively one or more of the existing ten traffic control bits may be assigned to a group or groups of machine-type devices instead of human operated devices. If such a control bit is switched from inhibiting a set of wireless devices, such as machine-type devices, from communicating to allowing said set of wireless devices to communicate, a number of wireless devices, particularly machine-type devices, may seek system access at the same time. This can potentially overload capacity of the wireless communication system, particularly if the period of inhibition of is long. Embodiments of the present technology may be directed toward alleviating this or similar problems, for example by utilizing a multi-bit bit sequence to communicate more information than the binary inhibit/allow message conveyed by a single bit.

In embodiments of the present technology, one or more spare or appropriated bits of another type of periodically broadcast message, such as a control, system, or information message, the broadcast message provided in accordance with a relevant wireless communication standard, may be used for communicating the bit sequence.

For example, in embodiments of the present technology, two or more control bits of the above-mentioned 16-bit data field, communicated in two or more sequentially broadcast system information messages, are interpreted as a bit sequence. This allows communication of more information than is possible with a simple binary indicator. In particular, embodiments of the present technology leverage the fact that the 16-bit data field and the bits within it, or other such data fields, it are regularly or periodically transmitted. Embodiments of the present technology are configured to serially communicate a bit sequence to one or more wireless devices by changing one or more bits, such as one or more control bits, of a broadcast message over multiple regular transmissions of the message, thereby facilitating communication of a traffic-control parameter, which may now have more than two states, encoded in the bit sequence.

In embodiments of the present technology, the bit sequence may be a predetermined fixed length, such as 4 bits or 8 bits. As messages indicative of the bit sequence are periodically broadcast in a substantially indefinite sequence, the bit sequence, as defined herein, may be viewed as part of a larger bit stream, comprising a sequence of bit sequences.

In some embodiments, sequential bit sequences may be communicated using a fixed-length sliding window technique. That is, the last N bits of the bit stream comprise the current N-bit bit sequence. For example, for a 4-bit bit sequence, wherein the last five bits of the bit stream are "11001," the latest two bit sequences are "1100" and "1001."

In some embodiments, sequential bit sequences may be communicated by considering different bit sequences as separate blocks of N bits. The number of bits in a block may be fixed or variable. The beginning of a block may be fixed or variable, and may in some embodiments be identified by a preamble, an out-of-band signal, or the like.

Other methods may also be used in communicating bit sequences, for example interleaving bit sequences with each other or with non-bit sequences, partially overlapping bit sequences, communicating bit sequences via scrambling and/or encoding of the bit stream, and the like. The bit sequence may be carried by a subset of broadcast messages, for example every second or third message.

Traffic-Control Parameters

In accordance with the present technology, a traffic-control parameter is generated and communicated, via a bit sequence, to one or more wireless devices. The wireless devices may be a targeted group of devices, such as machine-type devices or a set of predetermined types of machine-type devices. The one or more traffic-control parameters may comprise an inhibit/allow parameter, a delay parameter, a connection-time parameter, or the like, or a combination thereof.

In some embodiments, the one or more traffic-control parameters include a delay parameter, indicative of a desired distribution of delay times for delaying predetermined wireless communication activities, such as transmissions, of machine-type wireless devices.

In some embodiments, the delay parameter may be indicative of at least a maximum delay time that the wireless devices may wait before performing predetermined types of wireless communication activities. For example, each wireless device may independently generate a random, pseudo-random, or otherwise generated delay time from zero up to a maximum delay time indicated by the delay parameter. The random or pseudo-random delay time may be generated in accordance with a uniform probability distribution between 0 and the maximum delay time, or another predetermined type of probability distribution.

In some embodiments, the delay parameter may be indicative of other factors, such as a minimum delay time, a range or ranges of delay times, a type of probability distribution from which to randomly or pseudo-randomly generate delay times, or other rules for generating delay times, or the like. The delay parameter may be indicative of a combination of factors, such as a minimum and a maximum delay time.

In some embodiments, the one or more traffic-control parameters include a delay parameter integrated with an inhibit/allow parameter. For example, by communicating a delay parameter of a finite value, traffic is substantially allowed, whereas by communicating a delay parameter of an infinite value, traffic is substantially inhibited. Other means of integrating the delay and inhibit/allow parameter are described herein.

In some embodiments, the one or more traffic-control parameters include a connection time parameter, indicative of a maximum connection time for wireless devices. Each wireless device may be configured to limit duration of one or more communication operations to be less than or equal to the maximum connection time.

In some embodiments, one or more aspects of the one or more traffic-control parameters may be modified and/or selectively followed or ignored, or followed within predetermined limitations, by a wireless communication device. For example, a wireless communication device having high priority communications to send, may ignore or reduce a delay parameter in order to ensure data with low delay tolerance is transmitted without undesired inhibition.

Delay Parameter Conveyed by the Bit Sequence

Embodiments of the present technology will now be described, primarily with regard to an integrated delay parameter and inhibit/allow parameter of the one or more traffic-control parameters communicated via a bit sequence. These embodiments may also be adapted for conveying other parameters included in the one or more traffic-control parameters, such as a connection-time parameter.

The bit sequence may encode the delay parameter and inhibit/allow parameter in various ways. In some embodiments, for example, a bit sequence of all ones may indicate inhibition of transmission, while a bit sequence of all zeros may indicate transmission allowed, with a predetermined delay. Bit sequences having combinations of ones and zeros may indicate transmission allowed but with a delay time within a predetermined range indicated by the particular bit sequence. For example, the bit sequence may encode a maximum delay time, wherein the wireless devices randomly or pseudo-randomly determine a delay time up to the maximum delay time. Transmission then commences after the delay time elapses.

In some embodiments, the delay parameter and/or other traffic-control parameter is encoded as a binary number in the bit sequence. For example, the eight-bit bit sequence "00000011" may indicate three units of delay, or a delay time corresponding to a third entry in a lookup table, or the like. An N-bit bit sequence may thus encode up to $2^N$ values. In some embodiments, the bit sequence may be channel-coded, for example using CRC encoding, parity encoding, Reed-Solomon encoding, or the like, so as to detect and/or correct errors in the communicated delay parameter. In this case, the N-bit bit sequence may encode substantially less than $2^N$ values.

In embodiments of the present technology, each wireless device may be configured in accordance with a predetermined method to detect the beginning of a bit sequence, so as to be able to correctly decode the bit sequence, for example using a header, an out-of-band signal, a count synchronized in a predetermined manner, or the like or a combination thereof.

Wireless devices, in accordance with some embodiments of the present technology, may be configured to detect whether they are out of synchronization with the bit sequence, that is, if there is an error of the wireless device in determining the beginning of the bit sequence, the end of the bit sequence, and/or if intermediate bits of the bit sequence are missing, for example similarly to the phenomenon of a deletion channel. Various channel coding strategies may be used for detection and/or correction of these types of errors.

In some embodiments, a wireless device may be configured such that, if it determines that it has not correctly decoded the last PRACH control parameter message, then the wireless device will automatically default to a large delay time and/or maximum delay time, inhibit transmission, or the like.

In some embodiments, the delay parameter, and/or traffic-control parameter or other components thereof, is encoded as a ratio of ones to zeros in the bit sequence. For example the delay parameter communicated by the bit sequence 11001100 would be the same as that communicated by 10101010; both have four ones and four zeros. An N-bit bit sequence may encode up to N values in this manner. In some embodiments, other information may also be encoded in another manner into the bit sequence, for example by changing the bit pattern while retaining a specified ratio of ones to zeros.

In some embodiments, by encoding the delay parameter, or other parameter, as a ratio of ones to zeros, it may not be necessary to configure wireless devices to detect the beginning of the bit sequence, since the long-term ratio of ones to zeros is substantially independent of any bit sequence beginning or end, for example if the bit sequence repeats. Additionally, this approach makes communication of the bit sequence substantially more robust to synchronization or timing errors.

For example, in one embodiment, a four-bit bit sequence comprising four ones, that is, "1111," may indicate full transmission inhibition, while a bit sequence comprising four zeros may indicate no transmission inhibition and a relatively small maximum delay time preceding transmission. Additionally, the more zeros in the four-bit sequence, the smaller the delay parameter maximum delay and the shorter the range of corresponding transmission delay times. For example, a sequence with three "ones" and one "zero" could define a maximum delay time and/or delay range of one hour and a sequence of three "zeros" and one "one" could define a maximum delay time and/or delay range of 15 minutes. A sequence of two "ones" and two "zeros" could define a maximum delay time and/or delay range of 30 minutes. Other linear or nonlinear correspondences between ratios of ones to zeros and delay parameters, maximum delay times and/or delay ranges may also be used.

In various embodiments, positive logic or negative logic may be used when encoding traffic-control parameters, such as the delay parameter, in the bit sequence. Therefore, for example, all zeros may inhibit transmission and four ones may enable it. Ratios of zeros and ones may have other predetermined meaning with respect to random back-off delay range, distribution of delay times, minimum delay time, maximum message duration or connection time, quantity of payload data or channel use within a time window.

Additional Details and Embodiments

In some embodiments, the bit sequence may be used to communicate additional or other information to devices. For example, the bit sequence may contain encoded therein a connection-time parameter related to a maximum time that a device may actively access the system before releasing communication resources or at least re-checking demand for resources and possibly re-initiating a system access algorithm. In some embodiments, the connection-time parameter may be communicated as a separate parameter, for example using methods similar to those discussed herein with respect to transmitting the delay parameter. For example, bit sequences indicative of the connection-time parameter may be interleaved with bit sequences indicative of the delay time and inhibit/allow parameter, or different bit sequences may be communicated via different bits, or the like.

In some embodiments, the connection-time parameter may be communicated as a binary value, while the delay parameter may be communicated as a ratio of ones to zeros. In some embodiments, the connection-time parameter may be linked with the delay parameter. For example, the connection-time parameter may be substantially equal to the inverse of the delay parameter times a predetermined constant. In some embodiments, a bit sequence may be used as a reference value for generating both a delay parameter and a connection-time parameter. Use of a connection-time parameter may promote fairness or evenness of access between devices, by inhibiting devices from holding communication resources indefinitely.

In embodiments of the present technology, the bit sequence may be configured to indicate one or more predetermined groups of wireless devices which are currently authorized to perform one or more predetermined wireless communication activities. For example, the bit sequence 001001000 may be interpreted as authorizing devices belonging to groups 2 and 5 to transmit data in the wireless communication system. Authorization may alternatively indicate that devices of indicated priority levels are authorized to perform predetermined wireless communication activities. In some embodiments, communicating such a bit sequence may require devices to be synchronized to the bit sequence, so as to be capable of determining the beginning of the bit sequence in order to correctly interpret the meaning thereof. Alternatively, other encoding methods of the bit sequence, not requiring synchronization, may be used. For example, the number of back-to-back "ones" in a bit sequence may indicate the value of a group number currently authorized to transmit data.

Embodiments of the present technology may be applied to temporally spread out radio activity triggered by clock-synchronized applications. For example, in some networks, peaks in radio activity occur at regular intervals, for example 15 minute, 30 minute or 1 hour intervals, due to automated transmission activities by or other devices. Such peaks may correspond to radio activity which is several times the average radio activity. Such peaks may occur in data channels, signalling channels, or both, and may lead to network congestion or require costly communication system upgrades. Embodiments of the present technology may be applied to "smooth out" such peaks. For example, machine-type devices starting to transmit after a period of inhibition may each have different amounts of data to transmit. Machine-type devices with larger amounts of data may not be permitted to send all of their data immediately (possibly after a delay time) because this could cause them to unfairly consume system resources for an extended period of time, when other devices also require these resources. In this case longer messages may need to be broken into shorter ones with another random back-off delay required before the following part may be transmitted. For example, a connection-time parameter may be used to limit the time that a device performs a substantially uninterrupted communication operation.

Embodiments of the present technology may be applied to temporally spread out radio activity after a control bit is switched from a transmission-inhibiting state to a transmission-allowing state. As discussed above, transmission activity may peak after such a switch, for example due to built-up demand after a long period of inhibition. The present technology may alleviate such a peak by spreading out communications from different wireless devices which use different delay times, for example generated randomly. In some embodiments, the wireless devices may be configured to wait to receive a predetermined number of bits of the bit sequence before determining a delay time in accordance with the received delay parameter.

Embodiments of the present technology may be applied to mitigate an overload or congestion crisis of the network, by stopping substantially all communication of one or more groups of wireless devices. Subsequently, when the crisis has passed, communication due to wireless devices may be gradually re-introduced via the use of delay times. In such cases it may be desirable to inhibit transmission substantially immediately after a single bit of a bit sequence has been received, to avoid delays in dealing with the crisis. In some embodiments, a separate bit may be used to communicate an inhibit/allow traffic-control parameter. In some embodiments, an inhibit/allow traffic-control parameter may be communicated along with other information in an N-bit bit sequence by the following approach. A bit stream comprising sequential N-bit bit sequences is transmitted. As long as sequential bit sequences and/or contents encoded therein are substantially unchanged from bit sequence to bit sequence, the inhibit/allow parameter is interpreted as allowing transmission from the wireless devices. The contents of the bit sequence may also be interpreted for example as a current delay parameter. If, on the other hand, a change is detected from one bit sequence to the next, and/or from contents of one bit sequence to the next, the inhibit/allow parameter is interpreted as inhibiting transmission from the wireless devices. For example, this may result in immediate shut down of transmission upon detection that the ratio of ones to zeros within a four-bit window representative of the bit sequence has changed.

In some embodiments, detecting a change in a bit sequence comprises detecting a change in an established pattern of the bit stream. For example, the bit stream may be such that the same bit sequence, or the same ratio of ones to zeros in sequential bit sequences, or the like, is repeated often enough to establish a discernable pattern. Then, detecting a change in the bit sequence may comprise detecting a deviation from this established pattern. In some embodiments, the present technology may be configured to detect a change if it is above a predetermined noise threshold. For example, a change in the ratio of ones to zeros may be required to persist for two or more bit intervals before it is declared as a change. In some embodiments, a change is declared on the first instance of a detected change to the bit stream, thereby facilitating quick response time. In some embodiments, upon a first detected change, a change is provisionally declared, the change is then verified or falsified by further monitoring of the bit stream.

In some embodiments, upon a change or provisional change being detected in the bit sequence and/or contents thereof, a temporary inhibition of transmission for a fixed number of bit intervals may be asserted to allow the new sequence to be fully read. In some embodiments, this may be accomplished by interpreting the change as indicative of an inhibit/allow parameter being temporarily set to "inhibit."

In some embodiments, temporary inhibition may be accomplished by interpreting the change as indicative of a minimum delay time delay parameter. For example, upon detecting a change in the pattern of bits in the bit sequence, the ratio of ones to zeros in the bit sequence, or the like, a wireless device may be configured to wait for a minimum delay time to elapse before initiating communication operations. The minimum delay time may represent a lower limit on randomly or pseudo-randomly generated delay times, or it may be a time added to randomly or pseudo-randomly generated delay times, or the like. In some embodiments, the minimum delay time depends on the bit sequence. In some embodiments, the minimum delay time may be configured such that a wireless device does not initiate communication operations until after the new bit sequence is verified, or until transmission inhibition is confirmed, for example by receiving a bit sequence of all "ones."

Embodiments of the present technology may be configured so as to be backward compatible with other wireless devices, for example devices which may not be configured to wait a delay time before transmitting. For example, even if these other wireless devices transmit immediately after a transmission-inhibiting control bit is switched off, the traffic peak is lessened since devices configured in accordance with the present technology will typically wait for their delay time to expire.

Embodiments of the present technology may be applied to smoothly re-establish communications of wireless devices after an interruption, such as a catastrophic failure or emergency peak traffic requirements. In some embodiments, smooth re-establishment of communications may be achieved in part by making the delay parameter communicated to the wireless devices indicative of a maximum delay time, the wireless devices subsequently determining their own delay time up to the maximum delay time, for example randomly or pseudo-randomly, wherein the maximum delay time is a decreasing function of the proportion of ones in the bit sequence. A minimum delay time may also be implemented at each wireless device, for example to provide robustness to noise and/or to facilitate appropriate management of the wireless devices.

In embodiments of the present technology, a fixed-length sliding-window implementation may be used for communicating the bit sequence to the wireless devices. For example, the bit sequence may be N bits long, where for example N=4 or 8, and subsequent bit sequences may be communicated sequentially as part of a bit train, transmitted by the base station. Each wireless device may be configured to interpret the last N bits received as the current bit sequence or "word." The ratio of ones to zeros in such a sliding window implementation may be configured so as not to change between one sliding-window-interpreted word and the next, as long as the pattern of bits is substantially unchanged and the content of the bit sequence is substantially unchanged. For example, any four sequential bits in the bit train "10101010 . . . " will include two "ones." Changing the pattern may result in a temporary change in the number of "ones," a feature which may be used for further control of the wireless devices.

For example, in one embodiment, a four-bit bit sequence may be communicated serially using one bit in each of four sequential system information messages of a GSM-compliant or other wireless communication system. The four-bit sequence may thereby take 4×235.62 ms to transmit completely, in accordance with some GSM-compliant implementations. If the bit sequence is "1111," then transmission is inhibited. If the bit sequence is "1110," then transmission is allowed after a delay time, for example a random or pseudo-random delay time selected in accordance with a uniform probability distribution, up to a relatively long maximum delay time, thereby making the average delay time relatively long. In comparison, if the bit sequence is "0000," then transmission is allowed after a delay time up to a relatively short maximum delay time, thereby making the average delay time short. Bit sequences with two or three "ones" may result in intermediate maximum and average delay times.

In some embodiments, in addition to the above, each wireless device may be further configured having a minimum delay time. In some embodiments, the minimum delay time is configured to be at least as long as the time interval required for transmitting a bit sequence, for example for a four-bit bit sequence in a GSM-compliant system as described above, the minimum delay time may be 4×235.62 ms. In some embodiments, a timer counting time up to the delay time may be configured such that it resets upon detection of a change in state between sequentially received bit sequences. For example, a state of a bit sequence may be defined as the number of ones and zeros in the bit sequence. In some embodiments, the timer may be reset when a predetermined amount of change is detected in a filtered or averaged sequence of plural bit sequences.

Embodiments of the present technology may be configured so as to achieve smooth re-establishment of radio activity after an interruption. For example, if the state of a received bit sequence changes from a first state indicative of inhibition of transmission to another state indicative of allowance of transmission, wireless devices in accordance with some embodiments may be configured so as to gradually, instead of suddenly, start up radio activity, by waiting until at least a minimum delay time has passed before initiating communication operations. The time until the minimum delay time has passed may be referred to as an inhibition period. Use of an inhibition period may provide protection against erroneous ones being received in a sequence of zeros that would otherwise cause undesired radio activity.

In some embodiments, when a sliding-window implementation is used to communicate the bit sequence, wireless devices in accordance with the present technology may be configured to implement, after a period of inhibited transmission, a gentle ramp up of minimum and maximum delay times to a level corresponding to the number of ones in the current bit-sequence. As each new "zero" appears in the bit sequence, both minimum and maximum delay times may be decreased. A variable inhibition period is therefore implemented, which may be configured such that transmission is inhibited until a bit sequence is adequately verified.

In some embodiments, if an error detection mechanism such as CRC is used and it indicates a bit error but the error cannot be corrected then the error bit should be treated as a possible change that should force an inhibition of transmission.

Operation in LTE Systems

In wireless communication systems operating in accordance with the LTE (Long Term Evolution) standard, there exist two number values that are broadcast to wireless devices for use in traffic control. These include the "Barring Factor" F and the "Barring Time" T. The Barring Factor is a number between zero and one, that is used in a process of wireless devices in the LTE system to make a decision about whether to transmit or not. The "Barring Time", T is a value indicating an amount of time to wait if the aforementioned decision is to not transmit. Prior to or at the time of a transmission, a wireless device generates a random or pseudo-random number between zero and just slightly below one. A comparison is made between the random number and the current Barring Factor F. If the random number is more than F then transmission proceeds. If the random number is less than F then the wireless device must wait for a period defined by the Barring Time T before again generating a random number and performing the comparison with F.

Wireless devices operating in accordance with some embodiments of the present technology may be configured to generate or modify the current received Barring Factor and or Barring Time values using the determined traffic-control parameter, in a predetermined manner. For example, for a four-bit bit sequence, the Barring Factor F and Barring Time T may be generated from the bit sequence in accordance with the following formulae:

$$F = N_1/4; \text{ and}$$

$$T = N_1 \times 10,$$

where $N_1$ is the number of "ones" in the last four received bits of the bit sequence.

As another example, a look-up table may be stored in a wireless device, which defines the relationship between the number of ones in the last four received bits of a four-bit bit sequence and the Barring Factor F and Barring Time T. The following table is an example:

| Number of "ones" in four-bit window of Bit Sequence | Barring Factor F | Barring Time T |
|---|---|---|
| 0 | 0 | — |
| 1 | 0.1 | 10 sec |
| 2 | 0.25 | 20 sec |
| 3 | 0.5 | 50 sec |
| 4 | 1.0 | 200 sec |

In the above table, if the received 4-bit bit sequence is "0000" then the number of "ones" in the window is zero, and the Barring factor F is also 0. In this case, transmission will be uninhibited. If the received 4-bit bit sequence is "1111" then the Barring factor F will be 1. In this case, transmission will be inhibited for 200 seconds. If, after the 200 seconds has elapsed, the currently received 4-bit bit sequence is still "1111," transmission will continue to be inhibited for another 200 seconds.

As another example, the time that a wireless device waits before transmission may further be a function of a random or pseudo-random number. For example, a wait time may be given by:
Wait Time=$f$(random number, barring time),
where f is a linear or nonlinear function. For example:
Wait Time=$(0.7+0.6*\text{random number})*\text{barring time}$.

In embodiments of the present technology, these and/or other methods may be used to obtain a desired degree of control over wireless device traffic in an LTE system.

Priority Levels

In some embodiments, the present technology may be configured, for example through device or group subscriptions, locally stored or broadcast settings, or the like to accommodate different priority levels for different devices, applications, and/or data thereof to be transmitted. For example, a wireless device may be configured to ignore, partially ignore, or adjust one or more aspects of a traffic-control parameter based on its priority level, or a priority level associated with information to be transmitted thereby.

In some embodiments, if a delay parameter is below or above a predetermined threshold stored in memory of a wireless device, the wireless device may ignore delay times when transmitting. In some embodiments, the delay time and/or the maximum delay time may be limited to a maximum level determined by the priority level. For example, a high priority level may force the delay time to be less than or equal to 5 seconds. In some embodiments, the maximum delay time may be adjusted or customized by the wireless device in accordance with a priority level.

For example, upon receipt of a delay parameter indicative of a maximum delay time by a device, the device may adjust the maximum delay time, for example by reducing if the priority level is high, increasing it if the priority level is low, or the like. Reducing the maximum delay time may comprise multiplying the maximum delay time by a factor less than one, for example, or processing the maximum delay time in accordance with another linear or nonlinear function, look-up table, or the like. A delay time may then be generated up to the maximum delay time and the wireless device may then wait until this delay time elapses before transmitting.

In some embodiments, each wireless device is configured with a priority multiplier/divider stored therein, for example in the SIM. The delay time or maximum delay time may then be multiplied by the priority multiplier/divider.

As another example, the delay parameter may be indicative of a fraction of a reference maximum delay time stored in the device itself, which may be independently programmed for each device. For example, if the delay parameter is decoded as ¾, then the maximum delay time of each device is set to ¾ of the reference maximum delay time.

For example, the maximum delay time delay parameter and connection-time parameter for a high-priority device, as a function of the number of "ones" in a four-bit bit sequence may be determined in accordance with the following table:

| Number of "ones" in four-bit window | Maximum Delay Time (Delay Parameter) | Connection-Time Parameter |
|---|---|---|
| 1 | 1 sec | 10,000 sec |
| 2 | 2 sec | 5,000 sec |
| 3 | 4 sec | 1,000 sec |
| 4 | 8 sec | 500 sec |

As another example, the maximum delay time delay parameter and connection-time parameter for a low-priority device, as a function of the number of "ones" in a four-bit bit sequence may be determined in accordance with the following table:

| Number of "ones" in four-bit window | Maximum Delay Time (Delay Parameter) | Connection-Time Parameter |
|---|---|---|
| 1 | 10 sec | 1,000 sec |
| 2 | 20 sec | 500 sec |

| Number of "ones" in four-bit window | Maximum Delay Time (Delay Parameter) | Connection-Time Parameter |
| --- | --- | --- |
| 3 | 40 sec | 100 sec |
| 4 | 80 sec | 50 sec |

Wireless Device

Embodiments of the present technology relate to a wireless device, such as a wireless device, configured for communication with a wireless communication system, or a method related to such a wireless device. The wireless device may be a specially-provided wireless device or a standard wireless device configured, for example via software, in accordance with the present technology.

A wireless device according to an embodiment of the present technology can be operatively connected to an operator domain. The wireless device comprises a network interface or transceiver and a control module. The network interface/transceiver is provided to establish an operative connection with the wireless communication system. The control module is provided for controlling how the operative coupling of the wireless device to the network interface is established, and the like. In some embodiments, the wireless device may further be operatively coupled to an apparatus such as a utility meter reader, a teller machine, a vehicle surveillance device, a device for remote control or machinery, or other data source providing data, such as delay-tolerant data, for transmission by the wireless device, said transmission comprising wireless communication with the operator domain. In other embodiments, the wireless device may further be operatively coupled to a set of apparatuses, for example, when the wireless device is functioning as a router.

In some embodiments, a wireless device may be a machine-to-machine (M2M) or machine-type communication (MTC) device. In some embodiments, a wireless device may be used to provide at least communication functionality of an apparatus such as a utility meter reader, a teller machine, a vehicle surveillance device, a device for remote control or machinery or other apparatus. The wireless device may be operatively coupled to such an apparatus via a wired or local wireless connection, and/or the wireless device may be integrated as a component of such an apparatus. The wireless device may comprise electronics such as a data interface for communication with such an apparatus, along with other components as required, such as memory for storing said communications, and a processor for processing and responding to said communications.

The network interface of a wireless device is configured for operatively connecting the wireless device with the wireless communication system. Depending on the embodiment, the wireless communication system interface can operatively interconnect the wireless device with one or more components of the wireless communication system via one or more wireless interfaces and one or more communication protocols and wireless interconnect systems. For example, the network interface may be connected with an uplink or downlink or both uplink and downlink of a BTS/NodeB. The wireless communication system interface may include GPRS, UMTS, EVDO, or other wired or wireless interconnect systems. The network interface comprises wireless communication components such as one or more antennas, signal amplifiers, digital signal processors, modulators, radio transceivers, power sources, power control modules, digital interfaces, and the like, as would be readily understood by a worker skilled in the art.

The control module is operatively coupled to the network interface for processing data and controlling communication and functions of the wireless device in accordance with embodiments of the present technology. The control module is configured to determine the delay parameter based on the received bit sequence; generate a delay time based on the determined delay parameter; and cause the wireless device to wait until the delay time elapses before performing the one or more predetermined types of wireless communication activities.

In embodiments of the present technology, the control module comprises electronic components such as a microprocessor operatively coupled to memory, or a microcontroller or the like. Memory, such as RAM, ROM, electronic, magnetic or optical memory may be configured with instructions for execution on a processor for performing operations in accordance with the present technology. The control module may comprise an electronic interface for passing messages to the network interface for transmission, and for receiving information from the network interface indicative of signals associated with communications in the wireless communication system. The control module may also be operatively coupled to a data interface of the wireless device for receiving messages for transmission from an apparatus coupled thereto.

EXAMPLE

In the following example, it is assumed that a four-bit bit sequence is conveyed using a sliding window approach, and that one or more traffic-control parameters conveyed by the bit sequence include a delay parameter indicative of a maximum value of a delay time to be randomly or pseudo-randomly generated at a wireless device. The maximum delay time increases with the number of "zeros" in the bit sequence. A bit sequence of all "ones" indicates inhibition of transmission.

In an embodiment of the present example, if the maximum delay time according to a current bit sequence is short, for example in accordance with a current bit sequence "0000", a change to the bit sequence, for example due to the appearance of an additional "one," either intended or in error, may immediately inhibit transmission. Transmission may be held off until the change to the bit sequence can be verified, for example by inhibiting transmission for at least the amount of time it takes to receive four bits of a four-bit bit sequence. Thus, a "one" received in error may cause an unnecessary inhibition of radio activity, but only for a short time. A desired effect is immediate inhibition of radio activity, thereby facilitating greater or quicker control over the wireless devices. If the inhibition is indeed intended then the bit sequence will build to one comprising all "ones" without any transmission being allowed.

In the case that the maximum delay time is long but radio activity is not inhibited, for example in accordance with a bit sequence "1110," an erroneous "zero" instead of a "one" may reduce the maximum delay time delay parameter. However, this reduction may not take effect until reception of the next interval of four bits of the bit sequence, by which time the correct bit sequence should have re-established. If the single "zero" is missing either deliberately or erroneously, transmission will be inhibited immediately. This provides a fail-safe bias towards not transmitting.

In some embodiments, the minimum delay time may be variable depending on the received bit sequence. This may facilitate a faster re-start of the first transmissions while still meeting the objective of immediate shut down when required and also retaining a gradual restart capability. Error tolerance on re-start may be provided so as to avoid unwanted transmission.

Figure 5A:
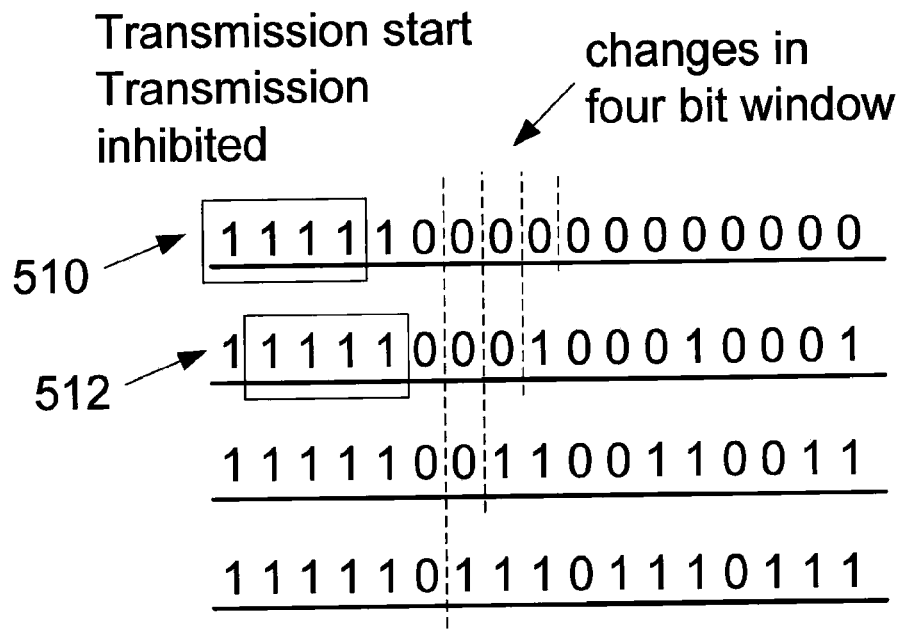
FIGS. 5A through 5E illustrate examples of transitions between transmission-enabled and transmission-inhibited states of a wireless device in accordance with embodiments of the present technology.

FIG. 5A shows examples of bit streams in which, initially, all four-bit windows, such as 510, 512, indicative of bit sequences comprise all "ones," which in the present example corresponds to transmission inhibition. As the inhibition of transmission ends, zeros start to appear in the current bit sequence. Wireless devices may start transmitting after a delay time which, initially, is on average relatively large since few zeros are initially present in the bit sequence. The maximum and hence average delay time would become shorter as more zeros appear in the bit sequence.

In some embodiments, if there is no transmit inhibition asserted for at least a window delay of four bits then an immediate re-assertion of a need to inhibit transmission may not be guaranteed until four more ones have again been detected. If the time for a single bit to be to be received is 235 ms then the time to detect four successive bits is just under one second. If a one second shut down delay is acceptable from a system perspective then a four bit inhibition of transmission on any change would be acceptable (assuming each bit is sent every 235 ms). One consequence of this if the communication is not error corrected, such as by some form of error correction encoding, is the possibility of unintended transmit inhibitions for about one second in a noisy channel. This will happen to any receiver that decodes uncorrected errors.

Figure 5B:
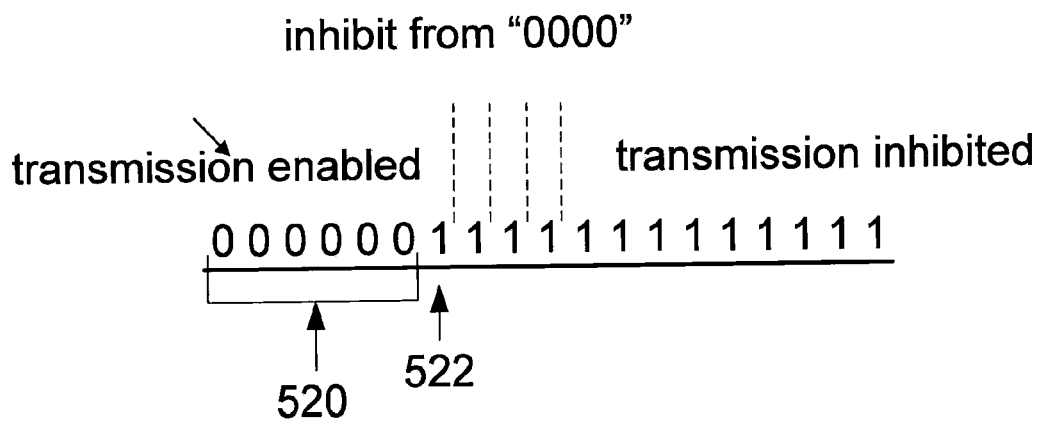

FIG. 5B shows the start of transmission inhibition from the shortest or no back off delay range, indicated by all zeros 520. Each successive "one" causes inhibition for at least one bit interval resulting in inhibition from the first "one" detected 522, until the full sequence of ones is received, positively asserting inhibition of transmission.

Figure 5C:
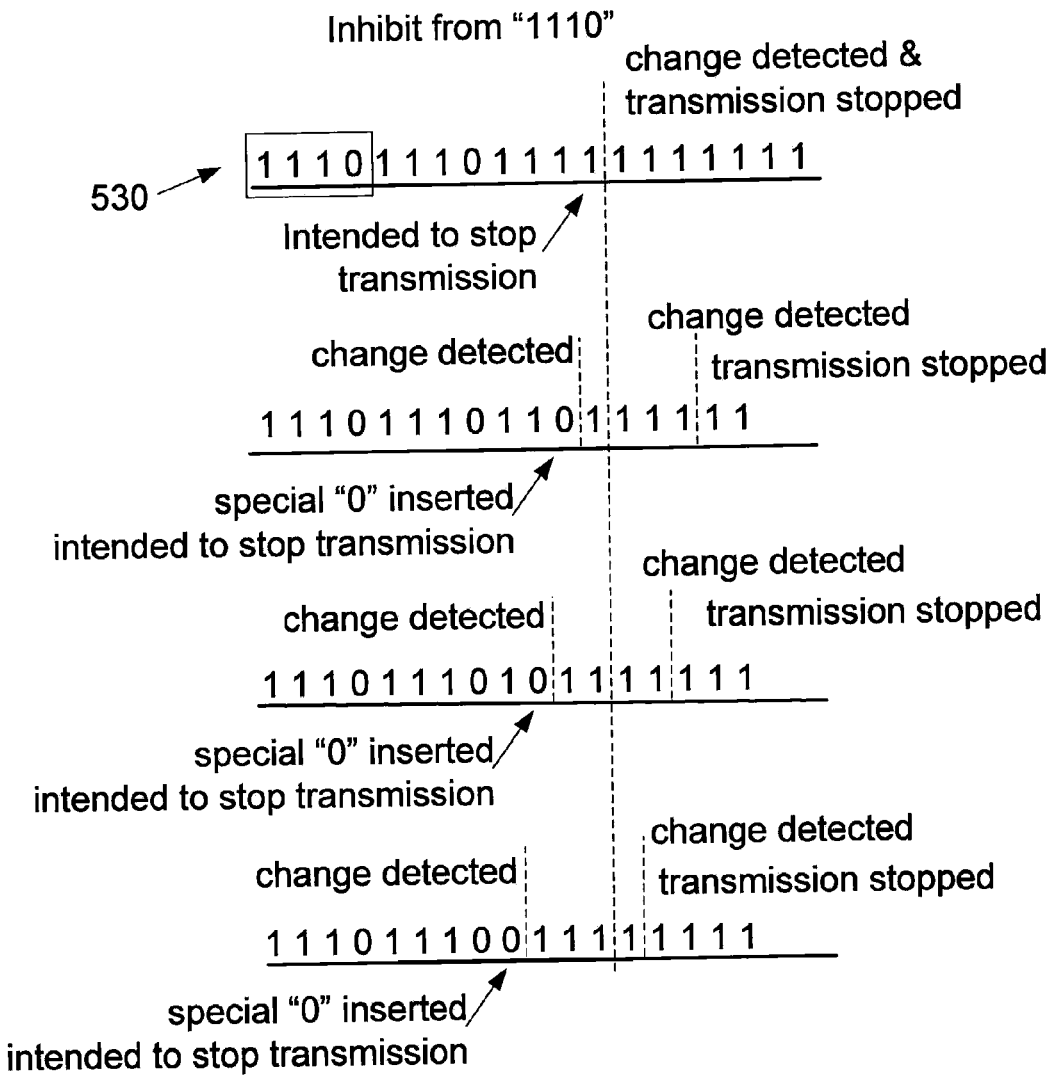
Figure 5D:
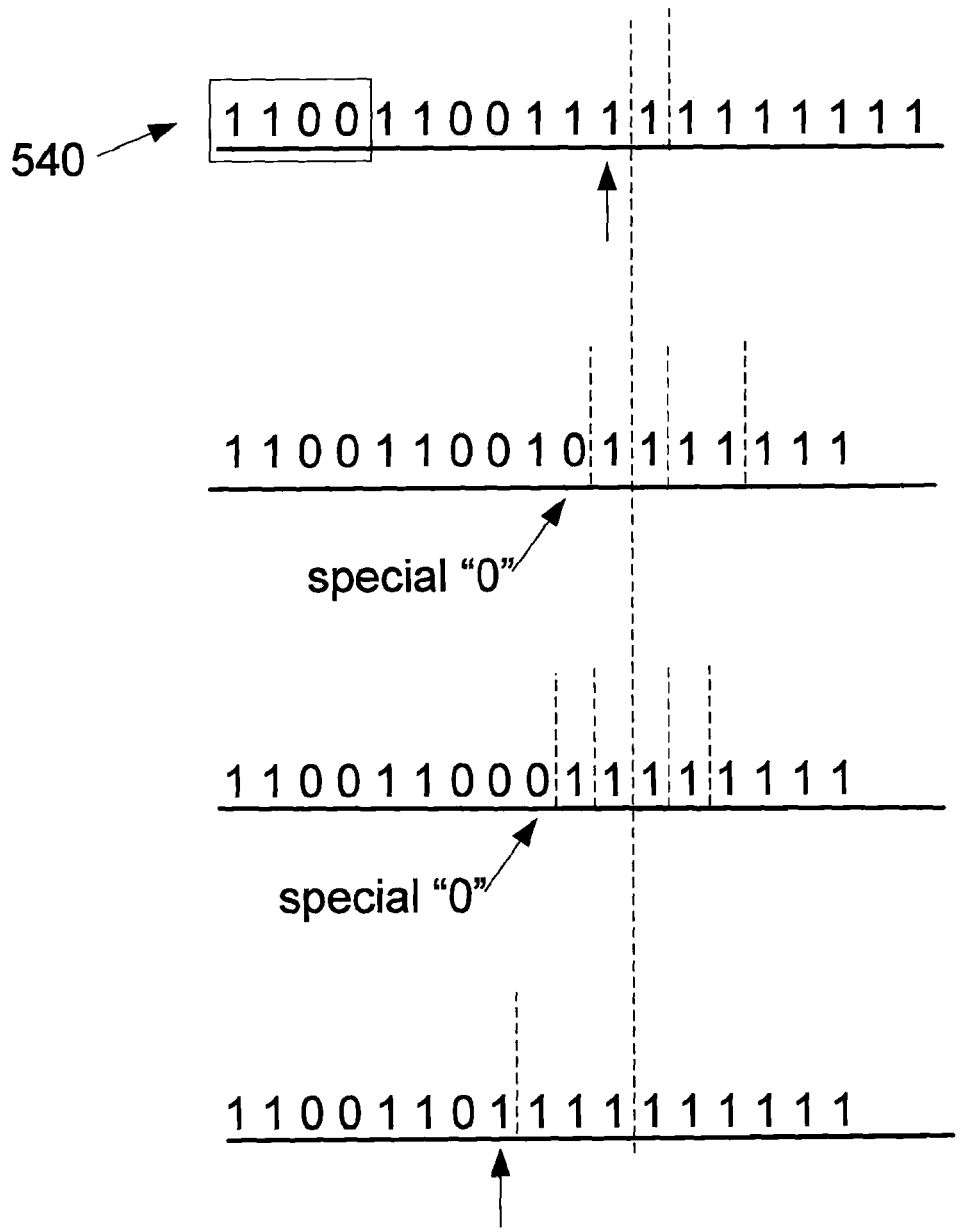
Figure 5E:
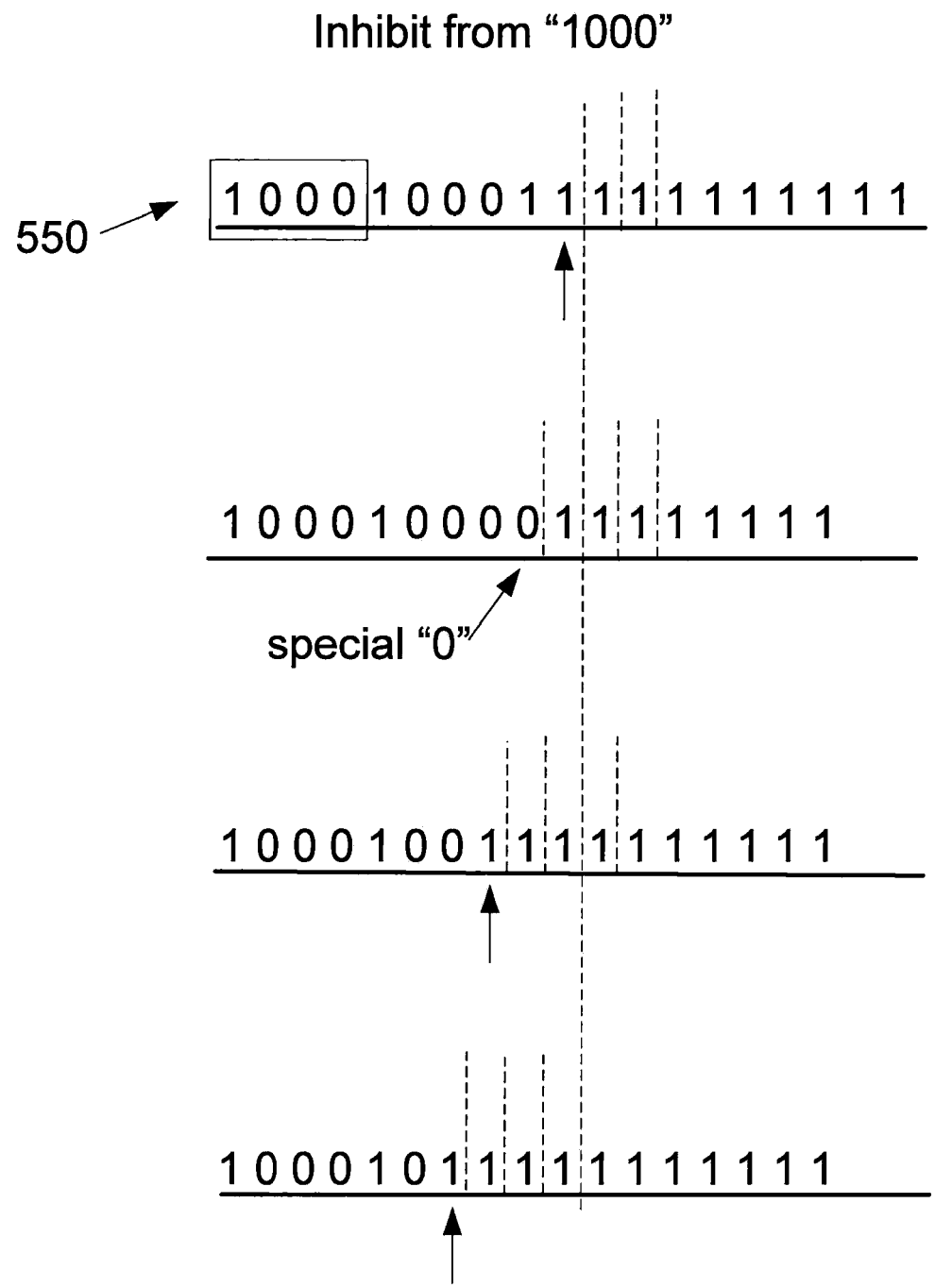

FIGS. 5C, 5D and 5E illustrate inhibition of transmission from three possible one/zero combinations 530, 540 and 550, respectively. These figures additionally show that, depending on the instant of the need to shut down and its "phase" or alignment with the sequence being transmitted, it is sometimes necessary to "complement" a bit in the bit stream, in this case transmitting a single "zero" instead of a "one" in order to facilitate establishing a detectable change on that bit interval. Following such a complemented bit, a forced inhibition period lasting at least the amount of time needed to receive three bits may be implemented at the wireless device in order to avoid unwanted momentary release of the inhibition before the full sequence of all ones is received. A default four bit delay during which inhibition is asserted after any change of detected sequence may be implemented so that transmission is inhibited within one bit period in all cases. This embodiment may also result in an inhibition of transmission by all devices until four bits are transmitted (just under 1 second) even when the delay backoff value is changed. Devices that wake up periodically to save power may need to listen for at least this amount of time to discover their designated random back off time.

It will be appreciated that, although specific embodiments of the technology have been described herein for purposes of illustration, various modifications may be made without departing from the spirit and scope of the technology. In particular, it is within the scope of the technology to provide a computer program product or program element, or a program storage or memory device such as a solid or fluid transmission medium, magnetic or optical wire, tape or disc, or the like, for storing signals readable by a machine, for controlling the operation of a computer and/or firmware according to the method of the technology and/or to structure its components in accordance with the system of the technology.

In addition, while portions of the above discuss the technology as it can be implemented using a generic OS and/or generic hardware, it is within the scope of the present technology that the method, apparatus and computer program product of the technology can equally be implemented to operate using a non-generic OS and/or can use non-generic hardware.

Further, each step of the method may be executed on any general computer, such as a personal computer, server or the like, or system of computers, and pursuant to one or more, or a part of one or more, program elements, modules or objects generated from any programming language, such as C++, C#, Java, PL/1, or the like. In addition, each step, or a file or object or the like implementing each said step, may be executed by special purpose hardware or a circuit module designed for that purpose.

It is obvious that the foregoing embodiments of the technology are examples and can be varied in many ways. Such present or future variations are not to be regarded as a departure from the spirit and scope of the invention, and all such modifications as would be obvious to one skilled in the art are intended to be included within the scope of the following claims.

We claim:

1. A method for managing communication operations of at least one wireless device in a wireless communication system, the method comprising:
   a. generating one or more traffic-control parameters indicative of one or more aspects of communication operations of the at least one wireless device;
   b. generating a bit sequence indicative of one or more traffic-control parameters;
   c. communicating the bit sequence to the at least one wireless device by transmitting different portions of the bit sequence in different broadcast messages belonging to a series of broadcast messages transmitted to the at least one wireless device;
   d. determining, at the at least one wireless device, the one or more traffic-control parameters based on the communicated bit sequence; and
   e. adapting, at the at least one wireless device, communication operations based on the one or more traffic-control parameters;

wherein communications of the at least one wireless device is delay-tolerant, and wherein adapting communication operations at the at least one wireless device comprises limiting communication resource usage by the at least one wireless device in order to facilitate access to said communication resource by at least one other wireless device.

2. The method according to claim 1, wherein the one or more traffic-control parameters include a delay parameter, and wherein said adapting communication operations based on the one or more traffic-control parameters comprises:
   determining a delay time based on the delay parameter; and
   waiting until the delay time elapses before initiating communication operations.

3. The method according to claim 2, wherein the delay time is determined to be between a minimum value and a maximum value.

4. The method according to claim 3, wherein the delay parameter comprises an indication of the maximum value of the delay time.

5. The method according to claim 3, wherein the delay parameter comprises an indication of the minimum value of the delay time.

6. The method according to claim 3, wherein the delay time is generated randomly.

7. The method according to claim 6, wherein the delay time is generated pseudo-randomly.

8. The method according to claim 2, wherein the delay parameter is encoded as a ratio of ones to zeros included in at least one or more portions of the bit sequence.

9. The method according to claim 1, wherein the one or more traffic-control parameters include a connection-time parameter, and wherein said adapting communication operations based on the traffic-control parameter comprises:
determining a maximum connection time based on the connection-time parameter;
and limiting duration of communication operations to less than or equal to the maximum connection time.

10. The method according to claim 9, wherein the connection-time parameter is encoded as a ratio of ones to zeros included in at least one or more portions of the bit sequence.

11. The method according to claim 1, wherein said one or more series of broadcast messages include one or more traffic control messages.

12. The method according to claim 1, wherein said one or more series of broadcast messages include one or more system information messages.

13. The method according to claim 1, wherein one or more of said series of broadcast messages are broadcast sequentially.

14. The method according to claim 1, wherein one or more of the traffic-control parameters are encoded as one or more ratios of ones to zeros in one or more portions of the bit sequence.

15. A system for managing communication operations of at least one wireless device in a wireless communication system, the system comprising:
a. a base station configured to generate one or more traffic-control parameters indicative of one or more aspects of communication operations of the at least one wireless device; generate a bit sequence indicative of the one or more traffic-control parameters; and transmit the bit sequence for receipt by the at least one wireless device by transmitting different portions of the bit sequence in different broadcast messages belonging to a series of broadcast messages transmitted to the at least one wireless device; and
b. at least one wireless device configured to receive the bit sequence; determine the one or more traffic-control parameters based on the received bit sequence; adapt communication operations based on the one or more traffic-control parameters, wherein communications of the at least one wireless device is delay-tolerant, and wherein adapting communication operations at the at least one wireless device comprises limiting communication resource usage by the at least one wireless device in order to facilitate access to said communication resource by at least one other wireless device.

16. The system according to claim 15, wherein the one or more traffic-control parameters include a delay parameter, and wherein adapting communication operations based on the one or more traffic-control parameters comprises:
determining a delay time based on the delay parameter; and waiting until the delay time elapses before initiating communication operations.

17. The system according to claim 16, wherein the delay parameter is indicative of one or more of a maximum value of the delay time, a minimum value of the delay time, a randomly generated delay time, and a pseudo-randomly generated delay time.

18. The system according to claim 15, wherein the one or more traffic-control parameters include a connection-time parameter, and wherein said adapting communication operations based on the traffic-control parameter comprises:
determining a maximum connection time based on the connection-time parameter;
and limiting duration of communication operations to less than or equal to the maximum connection time.

19. The system according to claim 15, wherein said one or more series of broadcast messages include one or more traffic control messages, one or more system information messages, or a combination thereof.

20. The system according to claim 15, wherein one or more of said series of broadcast messages are broadcast sequentially.

21. The system according to claim 15, wherein one or more of the traffic-control parameters are encoded as one or more ratios of ones to zeros included in at least one or more portions of the bit sequence.

22. A base station configured for managing traffic control of at least one wireless device, the base station comprising:
a. a control module configured to generate one or more traffic-control parameters indicative of one or more aspects of communication operations of the at least one wireless device, the control module further configured to generate a bit sequence indicative of the one or more traffic-control parameters; and
b. a transceiver configured to transmit the bit sequence for receipt by the at least one wireless device by transmitting different portions of the bit sequence in different broadcast messages belonging to a series of broadcast messages transmitted to the at least one wireless device;
wherein communications of the at least one wireless device is delay-tolerant, and wherein adapting communication operations at the at least one wireless device comprises limiting communication resource usage by the at least one wireless device in order to facilitate access to said communication resource by at least one other wireless device.

23. The base station according to claim 22, wherein said one or more series of broadcast messages include one or more traffic control messages, one or more system information messages, or a combination thereof.

24. The base station according to claim 22, wherein one or more of said series of broadcast messages are broadcast sequentially.

25. The base station according to claim 22, wherein one or more of the traffic-control parameters are encoded as one or more ratios of ones to zeros included in at least one or more portions of the bit sequence.

26. A wireless device comprising:
a. a transceiver configured to receive a bit sequence indicative of one or more traffic-control parameters, wherein different portions of the received bit sequence are received in different broadcast messages belonging to a series of broadcast messages being received by the wireless device; and
b. a control module configured to determine the one or more traffic-control parameters based on the received bit sequence and adapt communication operations based on the determined traffic-control parameter;
wherein communications of the at least one wireless device is delay-tolerant, and wherein adapting communication operations at the at least one wireless device comprises limiting communication resource usage by the at least one wireless device in order to facilitate access to said communication resource by at least one other wireless device.

27. The wireless device according to claim 26, wherein the one or more traffic-control parameters include a delay parameter, and wherein adapting communication operations based on the one or more traffic-control parameters comprises:
  determining a delay time based on the delay parameter; and waiting until the delay time elapses before initiating communication operations.

28. The wireless device according to claim 27, wherein the delay parameter is indicative of one or more of: a maximum value of the delay time, a minimum value of the delay time, a randomly generated delay time, and a pseudo-randomly generated delay time.

29. The wireless device according to claim 26, wherein the one or more traffic-control parameters include a connection-time parameter, and wherein adapting communication operations based on the traffic-control parameter comprises:
  determining a maximum connection time based on the connection-time parameter;
  and limiting duration of communication operations to less than or equal to the maximum connection time.

30. A computer program product comprising a memory having computer readable code embodied therein, for execution by a CPU, for performing a method for managing communication operations of at least one wireless device in a wireless communication system, the method comprising:
  a. generating one or more traffic-control parameters indicative of one or more aspects of communication operations of the at least one wireless device;
  b. generating a bit sequence indicative of one or more traffic-control parameters;
  c. communicating the bit sequence to the at least one wireless device by transmitting different portions of the bit sequence in different broadcast messages belonging to a series of broadcast messages transmitted to the at least one wireless device;
  d. determining, at the at least one wireless device, the one or more traffic-control parameters based on the communicated bit sequence; and
  e. adapting, at the at least one wireless device, communication operations based on the one or more traffic-control parameters;
wherein communications of the at least one wireless device is delay-tolerant, and wherein adapting communication operations at the at least one wireless device comprises limiting communication resource usage by the at least one wireless device in order to facilitate access to said communication resource by at least one other wireless device.

31. A computer program product comprising a memory having computer readable code embodied therein, for execution by a CPU, for performing a method for managing communication operations of at least one wireless device in a wireless communication system, the method comprising:
  a. generating one or more traffic-control parameters indicative of one or more aspects of communication operations of the at least one wireless device;
  b. generating a bit sequence indicative of one or more traffic-control parameters;
  c. communicating the bit sequence to the at least one wireless device by transmitting different portions of the bit sequence in different broadcast messages belonging to a series of broadcast messages transmitted to the at least one wireless device;
wherein communications of the at least one wireless device is delay-tolerant, and wherein adapting communication operations at the at least one wireless device comprises limiting communication resource usage by the at least one wireless device in order to facilitate access to said communication resource by at least one other wireless device.

32. A computer program product comprising a memory having computer readable code embodied therein, for execution by a CPU, for performing a method for managing communication operations of at least one wireless device in a wireless communication system, the method comprising:
  a. determining, at the at least one wireless device, one or more traffic-control parameters based on a communicated bit sequence wherein the communicated bit sequence is spread over two or more broadcast messages received by the at least one wireless device; and
  b. adapting, at the at least one wireless device, communication operations based on the one or more traffic-control parameters;
wherein communications of the at least one wireless device is delay-tolerant, and wherein adapting communication operations at the at least one wireless device comprises limiting communication resource usage by the at least one wireless device in order to facilitate access to said communication resource by at least one other wireless device.

33. The method according to claim 1, wherein said series of broadcast messages are broadcast messages used primarily for another purpose by the wireless communication system, and wherein the bit sequence is conveyed via unassigned bits of said series of broadcast messages.

34. The method according to claim 1, wherein the at least one wireless device is an M2M device representing a strict subset of all wireless devices in the wireless communication system, and where wireless devices other than the at least one wireless device are not responsive to the bit sequence.

* * * * *